United States Patent [19]

Repa

[11] Patent Number: 5,155,915
[45] Date of Patent: Oct. 20, 1992

[54] TELESCOPIC SIGHT MOUNTING

[76] Inventor: Otto Repa, Brandeckerstrasse 9, 7238 Oberndorf, Fed. Rep. of Germany

[21] Appl. No.: 660,407

[22] Filed: Feb. 11, 1991

[30] Foreign Application Priority Data

Feb. 24, 1990 [DE] Fed. Rep. of Germany ... 9002214[U]
Feb. 24, 1990 [DE] Fed. Rep. of Germany ... 9002215[U]

[51] Int. Cl.⁵ .......................................... F41G 1/387
[52] U.S. Cl. ..................................... 33/247; 33/244; 33/250; 42/100
[58] Field of Search ............... 33/247, 244, 245, 249, 33/250, 252; 42/100, 101

[56] References Cited

U.S. PATENT DOCUMENTS

| | | | |
|---|---|---|---|
| 2,193,094 | 3/1940 | Gilbert | 33/245 |
| 2,451,266 | 10/1948 | Whittemore | 33/245 |
| 2,803,880 | 8/1957 | Weaver | 33/249 |
| 2,836,895 | 6/1958 | Dillon | 33/245 |
| 3,208,146 | 9/1965 | Nelson | 33/244 |
| 3,235,967 | 2/1966 | Moure et al. | 33/247 |
| 3,405,448 | 10/1968 | Weatherby | 33/245 |
| 3,977,113 | 8/1976 | Howell | 33/244 |
| 4,383,371 | 5/1983 | Coffey | 33/247 |
| 4,926,576 | 5/1990 | Maes et al. | 33/250 |
| 4,934,085 | 6/1990 | Lough | 42/101 |

FOREIGN PATENT DOCUMENTS 199957 7/1908 Fed. Rep. of Germany ........ 33/245

Primary Examiner—William A. Cuchlinski, Jr.
Assistant Examiner—C. W. Fulton
Attorney, Agent, or Firm—Edmund M. Jaskiewicz

[57] ABSTRACT

The telescopic sight mounting comprises a base (1) supporting telescopic sight (15) with a one-sided catch member (2) encompassing a mounting track (12) of the weapon and a springloaded clamping catch member (3), mounted to pivot in base (1), opposite catch track (2). With the help of a tension lever (11), clamping catch member (3) can be pressed against mounting track (12). Clamping catch (3) is stopped in the pressing position by passing the dead-center position between tension lever (11) and a connecting rod (8) acting on clamping catch (3). To protect against damage, telescopic sight (15) or telescopic sight mounting (2, 3) is surrounded by a cover (16, 17) fastened to telescopic sight mounting (2, 3).

17 Claims, 4 Drawing Sheets

FIG.2
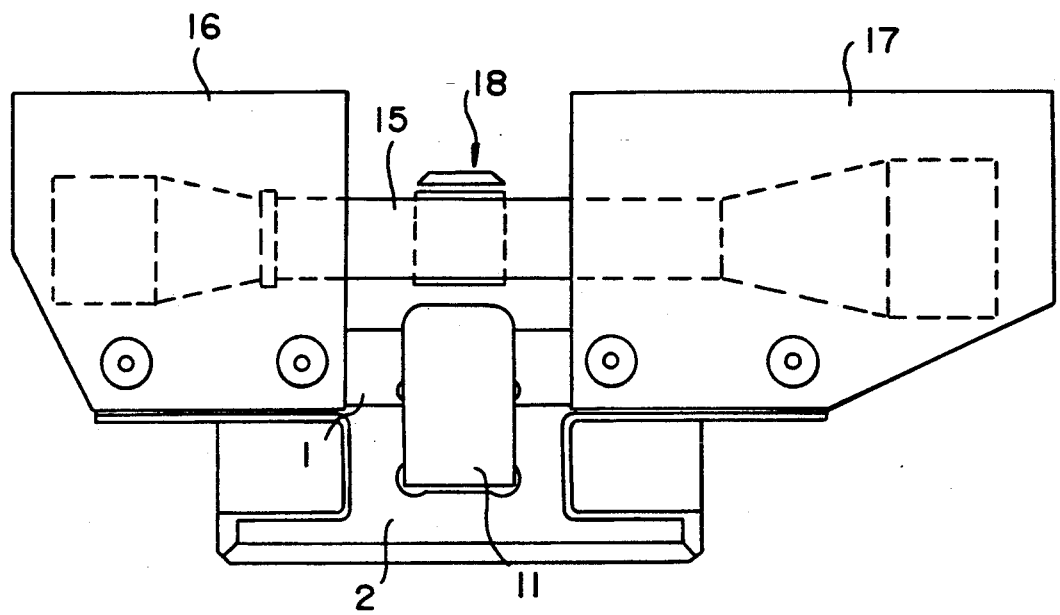
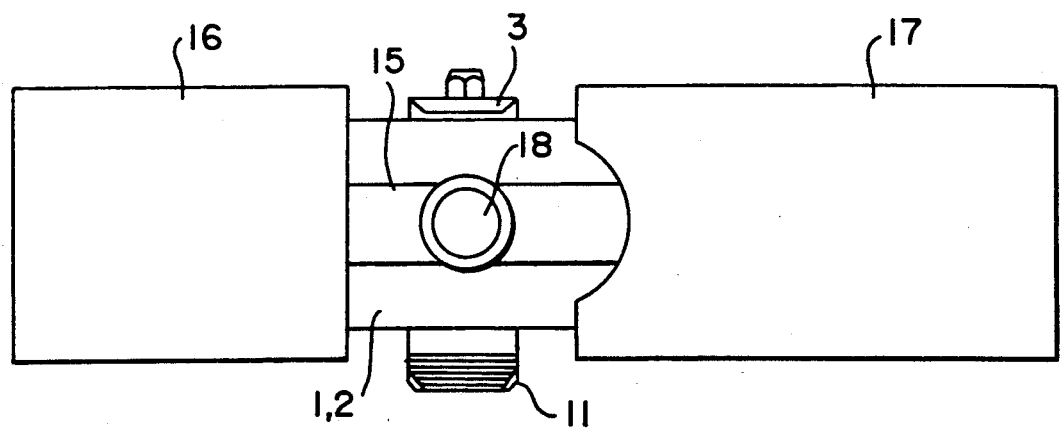
FIG.3

TELESCOPIC SIGHT MOUNTING

The present invention relates to a telescopic sight mounting, more particularly, to the detachable fastening of a telescopic sight on a dove-tail shaped mounting track attached to a firearm.

Different "mountings" for fastening a telescopic sight on a weapon are known. In addition to the predominant pivot mounting, there are various forms of catch mountings, tilting and sliding or attaching mountings. Each of these mounting types has its special advantages for the respective application of the weapon. The invention relates to the telescopic sight mounting in which the mounting track indicated above is already attached to the small arm. Vise jaws or retaining rings, depending on the type of telescopic sight, have been used up to now for sliding the telescopic sight on this track, and these mounting parts have clamping jaws constructed in dove-tail shape on the underside, which are to be pressed onto the mounting track by a threaded spindle or set screw.

As experience has shown, this type of fastening of the telescopic sight to the mounting track is unsuitable and inaccurate. The pressing force of the clamping jaws on the assembly track is left up to the discretion of the rifleman. In this case, the pressing force can be too low, but also too high. In the first case, no satisfactory fit of the telescopic sight on the weapon is assured; in the second case, damage to the mounting parts can result. It must be borne in mind that all these telescopic sight-fastening parts have to be quite small and relatively delicate structure simply for the reason alone that with the usual mountings, space for a sturdy construction of these components is lacking. Further, it is a disadvantage that the act of fastening of the telescopic sight in the case of the known mountings requires comparatively much time, a factor which rules out this type of mounting for military weapons.

Another drawback of the known telescopic sight mountings and telescopic sights, quite generally optical sights, consists in the fact that by themselves only small shock stresses can be absorbed by the installed optical glasses, as also by their fine-membered design. Therefore, if the weapons are not in use, the sights should be removed from the weapon and placed in a separate, protective case. Although this is still conceivable in the case of sporting weapons, it is ruled out in hunting weapons and especially in military weapons. Here, the telescopic sight must remain on the weapon for immediate use, and is therefore exposed in use to the unavoidable shock stresses. Actually, the riflemen, of course, try to keep any such blows and impacts from the telescopic sight, but this is not always possible. In military weapons, it is assumed that such shock stresses are invariably the rule.

It is therefore the principal object of the present invention to provide a novel and improved telescopic sight mounting.

It is another object of the present invention to provide a telescopic sight mounting which always assures a reliable fit of the telescopic sight on a mounting track without damaging the individual parts and which permits the fastening of the sight in a very short time.

It is a further object of the present invention to provide such a telescopic sight mounting which is provided with a cover structure to protect the components of the telescopic sight from physical impacts and shocks.

The objects of the present invention are achieved and the disadvantages of the prior art are eliminated by the telescopic sight mounting of the present invention which is provided on its underside with a fixed catch member and opposed therefrom is a spring-loaded catch member pivotably mounted on the base of the mounting.

According to one aspect of the present invention, a device for detachably mounting a telescopic sight on a dove-tailed shaped mounting track attached to a firearm may comprise a base upon which a telescopic sight can be mounted. On the underside of the base there is provided a first catch member and opposed therefrom is a second catch member which is pivotally mounted on the base. The catch members are shaped to clamp onto a dove-tail shaped mounting track. Means are provided on the base for spring loading the second pivotable catch member in a clamped position.

Thus clamping jaws are no longer pressed, as up to now, manually onto the dove-tail-shaped mounting track by a threaded spindle, but a spring-loaded clamping catch is continually pressed with constant pressure onto the mounting track. This uniform and constant pressing assures not only a reliable fit of the base and thus of the telescopic sight on the mounting track but it also causes the base to be drawn on the holding plate of the mounting track, i.e., toward the weapon, and thus it not only is secure but also is in correct position on this mounting track.

To attach the base according to the invention to the mounting track, the clamping catch can be beveled on its front end so that the base can be simply slid on the mounting track. However, this is not advisable, especially if these parts are dirty. It is therefore further proposed according to the invention that the clamping catch be connected on the other side of its support with a pressure plate, which swings horizontally when the clamping catch is pressed, so that the base can be mounted from above on the mounting track. This type of mounting can also be facilitated according to the invention in that an L-shaped tension lever is mounted on the other side of the pressure plate. On the short leg of the lever a connecting rod passing through the pressure plate is pivotally connected so that the pressure plate is drawn by horizontally swinging the tension lever and thus the clamping clatch is swung horizontally into the the "open" position. With this structure, a compression spring resting on the pressure plate can also be positioned in a space-saving manner, by this compression spring, advantageously a cup spring set, being placed on the connecting rod. In this case, the center line is to be between the ball pressure piece and the pivotal point of the connecting rod and thus the line of application of the spring tension lies between the support of the clamping catch and that of the tension lever, by which an automatic locking of the tension lever takes place in the use or clamped position.

The self-locking nature of the clamping is an essential feature of the invention. By the cup springs, a bracing by the tension lever in connection with the connecting rod and the ball pressure piece on the clamping catch and the mounting track results. A moment of force, which the tension lever presses against its stop on the base, results with going beyond the dead-center position or the connecting line between the pivot point of the ball pressure piece and the pivotal point of the tension lever.

A telescopic sight mounting thus results which not only assures reliable fastening of the telescopic sight to the mounting track without damage of the individual parts but which also permits a quick fastening of the telescopic sight to this mounting track.

The protection of the telescopic sight and the telescopic sight mounting against physical blows or shock stresses is achieved according to the invention by a cover of an inflexible material to be fastened in a detachable manner on the telescopic sight mounting or on the barrel/breech chamber, to enclose the telescopic sight spaced at a short distance.

The telescopic sight of the weapon no longer, i.e. as up to now, has to be removed to protect it from shock stresses with rough use, but it can remain on the weapon for immediate use; however, it is protected when mounted by a surrounding, inflexible cover. To avoid pressure on the telescopic sight, also in the case of fouling, the cover is to be located to be spaced at a small distance from the mounted telescopic sight.

The inventive concept further includes the cover being divided in two, to form front and back cover parts. As a result, the adjustment of the telescopic sight, which is usually in the center of the telescope, is not impaired in any way.

In one embodiment, the cover or the cover parts can be attached by screws directly onto the mounting or onto corresponding fastening points of the barrel or the breech chamber.

However, this is based on the assumption that the telescopic sight in its longitudinal direction can be removed from the cover. But this is not possible in the usual mountings for optical sighting devices. Here, it is proposed according to the invention that the cover or cover parts be provided on the bottom edges with inwardly projecting longitudinal tracks above and the mounting be provided with correspondingly applied grooves for the sliding of the cover or the cover parts. Thus, the cover can be slid up to a stop over the mounted telescopic sight and can be secured in this position, for example, by a ball notch. The same is also possible, of course, by the cover being slipped over the telescopic sight from above and being locked again in the use position.

Another modification according to the invention is that a folding hinge is attached, on the one hand, to a lower edge of the cover or the cover parts and, on the other hand, to the mounting or to the barrel/breech chamber, so that the cover can be folded out for attaching the telescopic sight and then can be folded over the telescopic sight. This solution has the advantage that the cover parts can always remain connected to the weapon, i.e. cannot be lost.

It is also preferable that the cover (or the cover parts) is made of slightly springy material, so that it is firmly applied on its fastening parts in the use position.

Not to increase too much the weight of the weapon provided with this cover and thus to impede the handling of the weapon, the cover can also be made of a light metal, such as aluminum or an alloy thereof.

Other objects and advantages of the present invention will be apparent upon reference to the accompanying description when taken in conjunction with the following drawings, which are exemplary, wherein;

FIG. 2 is a side elevational view of the telescopic sight mounting according to the present invention and the telescopic sight enclosed by front and rear cover parts;

FIG. 3 is a top plan view of the telescopic sight mounting and cover parts shown in FIG. 2;

Proceeding next to the drawings wherein like reference symbols indicate the same parts throughout the various views a specific embodiment and modifications of the present invention will be described in detail.

Figure 1:
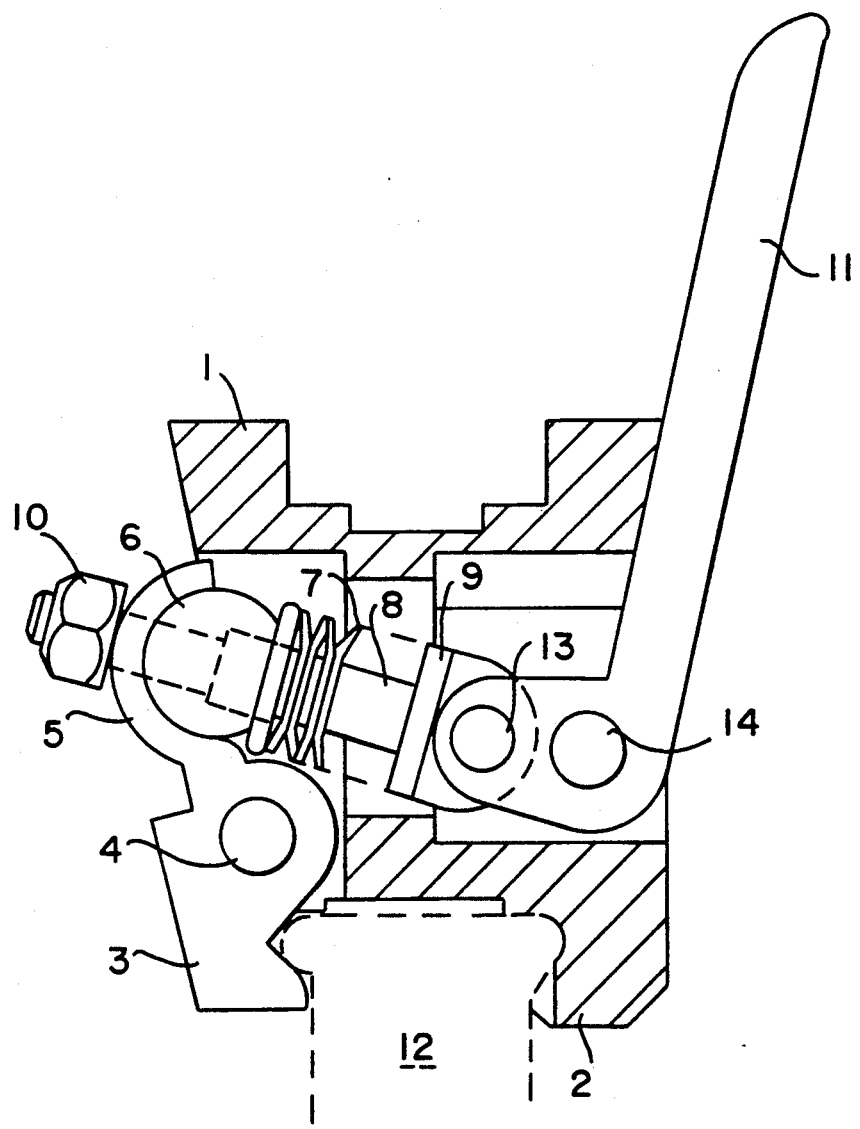
FIG. 1 is a vertical sectional view through the telescopic sight mounting according to the present invention.

A catch member (2), which is opposite a clamping catch member (3) that can swing horizontally, is provided on the underside of a base (1), to which the telescopic sight is to be firmly attached Clamping member (3) is mounted in a pivot journal (4) on the base (1) and on the other side of this catch member is connected to a universal ball joint-shaped pressure plate (5). A ball-shaped pressure piece (6) of a cup spring set (7) engages in this universal ball joint-shaped pressure plate (5). The spring (7) is placed on a connecting rod (8) and is braced on a collar (9) on the other end of the spring. Connecting rod (8) penetrates through the universal ball joint-shaped pressure piece (5) and is secured in this position by a nut (10) on its end. On its other side, connecting rod (8) is pivotally connected to the short lever arm of an L-shaped tension lever (11). Tension lever (11) is pivotally mounted at a pivot point (14) of base (1) to be swingable horizontally.

In the position of use, as shown in FIG. 1, tension lever (11) is folded upward, so that the force of cup spring set (7) can have an effect between collar (9) and universal ball joint-shaped pressure plate (5). Thus, clamping catch member (3) is swung horizontally in the direction of mounting track (12) (drawn in dots and dashes) or pressed on the dove-tail-shaped design of this mounting track (12). At the same time, base (1) is also pulled downward onto the holding plate of mounting track (12). Thus, a reliable fit of base (1) and thus also of the telescopic sight fastened to it on the weapon is assured. At the same time, tension lever (11) is also guided to a stop or held securely in this use or clamped position by the action of force of the compression spring (of cup spring set 7), whose line of application is between pivot support (4) of clamping catch (3) and that of tension lever (11). To remove the base from the weapon, only tension lever (11) has to be swung toward a horizontal position, so that then connecting rod (8) swings in a vertical plane over nut (10), pressure plate (5) and thus also entire clamping catch member (3). Thus, the entire base can be removed from the weapon with the installed telescopic sight without further measures. Altogether, there results not only a quick mounting of the telescopic sight, both to attach the telescopic sight to the weapon and to remove it, but also an exceptionally reliable and accurate fastening of this optical sight.

Telescopic sight (15) or telescopic sight mounting (2, 3) is surrounded and enclosed at a distance by two cover parts (16, 17) which prevent mechanical damage to the telescopic sight and the telescopic sight mounting. The two-part division of cover (16, 17) makes possible in this case the operation of adjustment (18) of telescopic sight (15).

Enveloping the telescopic sight or the telescopic sight mounting according to the invention is not limited to the embodiment, but can be used advantageously quite generally in telescopic sights.

Figure 4:
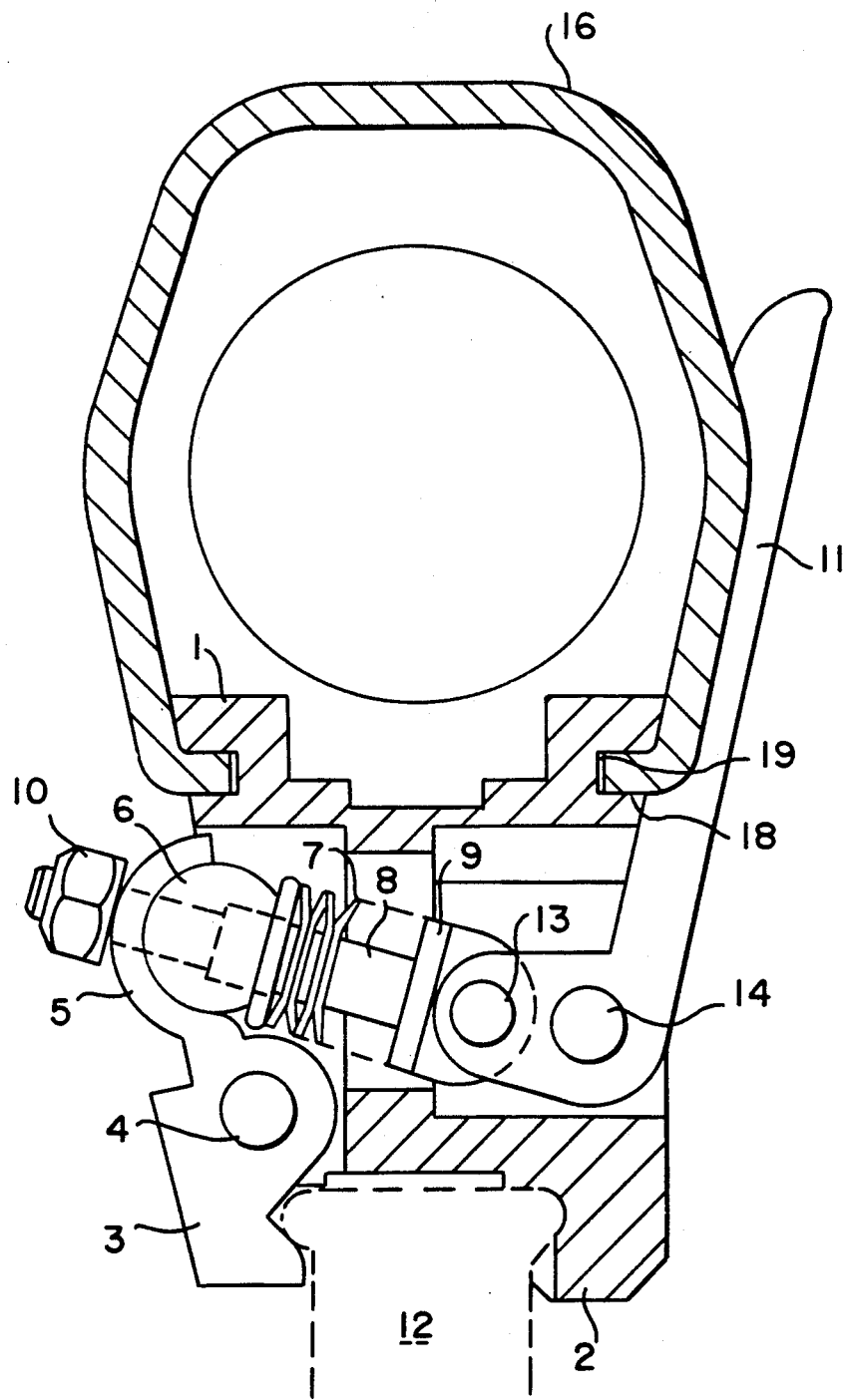
FIG. 4 is a vertical sectional view through the telescopic sight mounting having a cover with inwardly projecting longitudinal tracks seated in grooves in the mounting.

In FIG. 4, the cover (16) is provided along its lower edges with longitudinally extending tracks (18) which are seated into correspondingly shaped grooves (19) formed in the mounting (1).

Figure 5:
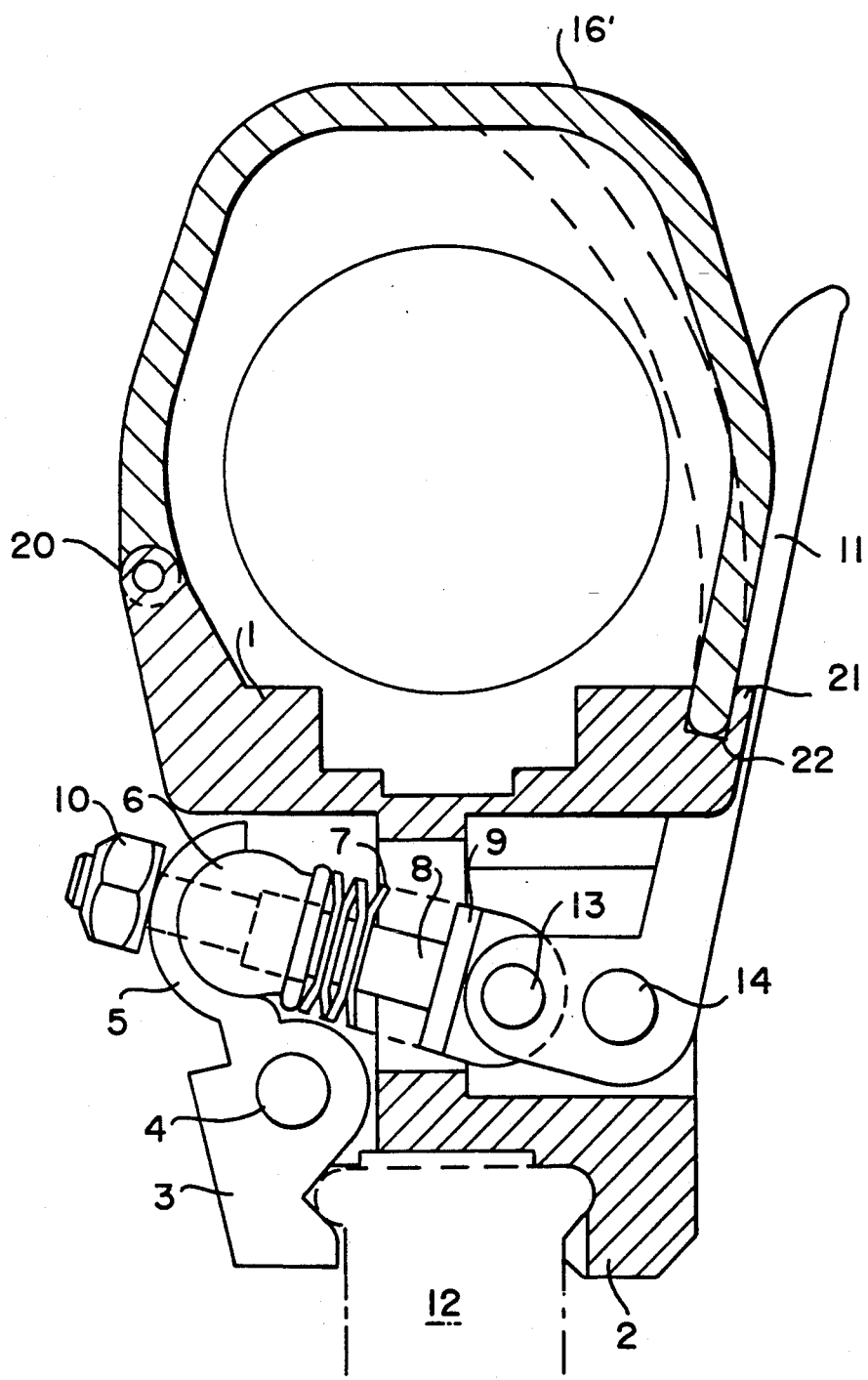
FIG. 5 is a vertical sectional view similar to that of FIG. 4 but having a cover with one edge thereof being hingedly connected to the mounting.

FIG. 5 shows a cover (16') having one edge (20 pivotally connected by a suitable hinge on a portion of the mounting (1) and the other edge (21) is fitted into a groove (22) formed in the mounting (1). As shown by the dashed lines, cover (16') is made of a slightly springy material, such a synthetic plastic, to facilitate insertion of its end (21) into the groove.

Thus it can be seen that the present invention has disclosed a novel and improved telescopic sight mounting which can be quickly and securely positioned upon a dove-tailed mounting track on a firearm merely by actuating a tension lever in a horizontal direction. To release the mount, it is only necessaty to pivot the tension lever in the opposite direction which causes the spring to extend when it passes the dead center position and further causes the pivotable catch member to be released from the mounting track. Both catch members are shaped with lips or extending edges so as to grip underneath the dove-tailed shaped track as shown.

It will be understood that this invention is susceptible to modification in order to adapt it to different usages and conditions, and accordingly, it is desired to comprehend such modifications within this invention as may fall within the scope of the appended claims.

What is claimed is:

1. A device for detachably mounting a telescopic sight on a dove-tailed shaped mounting track attached to a firearm comprising a base upon which a telescopic sign can be mounted, said base having an underside and a first catch member on said underside, a second catch member on said base underside opposed from said first catch member and pivotably mounted on said base for movement between clamped and release positions, said first and second catch members being shaped to clamp onto a dove-tail mounting track, and means on said base for spring-loading said pivotable second catch member in the clamped position, said second catch member comprises a pivotably mounted lever having a first arm opposed from said first catch member and a second arm, and a pressure plate on said second arm, a compression spring disposed between said pressure plate and a portion of said base, an L-shaped tension lever piovtably mounted on said base opposed from said pressure plate and having a short leg and a long leg, and a connecting rod pivotably connected to said short leg of said tension lever and to said pressure plate.

2. A device as claimed in claim 1 and further comprising a compression spring disposed between said pressure plate and a portion of said base.

3. A device as claimed in claim 2 and further comprising an L-shaped tension lever pivotably mounted on said base opposed from said pressure plate and having a short leg and a long leg, and a connecting rod pivotably connected to said short leg of said tension lever and to said pressure plate.

4. A device for detachably mounting a telescopic sight on a dove-tailed shaped mounting track attached to a firearm comprising a base upon which a telescopic sight can be mounted, said base having an underside and a first catch member on said underside, a second catch member on said base underside opposed from said first catch member and pivotably mounted on said base for movement between clamped and release positions, said first and second catch members being shaped to clamp onto a dove-tail mounting track, and means on said base for spring-loading said pivotable second catch member in the clamped position, said second catch member comprises a pivotably mounted lever having a first arm opposed from said first catch member and a second arm, and a pressure plate on said second arm, a compression spring disposed between said pressure plate and a portion of said base, an L-shaped tension lever pivotably mounted on said base opposed from said pressure plate and having a short leg and a long leg, and a connecting rod pivotably connected to said short leg of said tension lever and to said pressure plate, a collar on said connecting rod, said compression spring being disposed around said connecting rod and having one end acting against said pressure plate and a second end acting against said collar.

5. A device as claimed in claim 4 wherein said connecting rod passes through said pressure plate.

6. A device as claimed in claim 4 wherein said pressure plate is shaped to define a portion of a sphere, and a ball shaped pressure member conforming with said curved pressure plate to define a ball joint and interposed between said pressure plate and said one end of said compression spring.

7. A device as claimed in claim 6 wherein said tension lever is pivotable between closed and released positions, the pivot connection of said connecting rod to said short leg of said tension lever being below a line extending between the center point of said ball pressure member and the pivot mount of said tension lever.

8. A device as claimed in claim 4 and further comprising a cover detachably mounted on said base to enclose a telescopic sight mounted on said base.

9. A device as claimed in claim 8 wherein said cover comprises a pair of axially spaced cover members.

10. A device as claimed in claim 8 wherein said cover has a pair of longitudinally extending spaced tracks directed inwardly toward each other, there being grooves on said base correspondingly shaped to slidably receive said cover tracks.

11. A device as claimed in claim 10 wherein said cover comprises a substantially rigid material.

12. A device as claimed in claim 8 wherein said cover has a pivotable connection along a lower edge thereof to said base.

13. A device as claimed in claim 8 wherein said cover comprises a slightly flexible material.

14. A device as claimed in claim 8 wherein said cover comprises a light metal material.

15. A device as claimed in claim 8 wherein said cover has a substantially U-shape and the edges of its open ends are attached to said base.

16. A device for detachably mounting a telescopic sight on a dove-tailed shaped mounting track attached to a firearm comprising a base upon which a telescopic sight can be mounted, said base having an underside and a first catch member on said underside, a second catch member on said base underside opposed from said first catch member and pivotably mounted on said base for movement between clamped and release positions, said first and second catch members being shaped to clamp onto a dove-tail mounting track, and means on said base for spring-loading said pivotable second catch member in the clamped position, said second catch member comprises a pivotably mounted lever having a first arm opposed from said first catch member and a second arm, and a pressure plate on said second arm, a compression spring disposed between said pressure plate and a portion of said base, an L-shaped tension lever piovtably mounted on said base opposed from said pressure plate and having a short leg and a long leg, and a connecting rod pivotably connected to said short leg of said tension lever and to said pressure plate, the center line of said compression spring extends thorough said pressure plate and the pivot connection of said connecting rod to said short leg of said tension lever such that the application of spring force is between the pivot mount of said second catch lever and the pivot mount of said tension lever.

17. A device for detachably mounting a telescopic sight on a dove-tailed shaped mounting track attached to a firearm comprising a base upon which a telescopic sight can be mounted, said base having an underside and a first catch member on said underside, a second catch member on said base underside opposed from said first catch member and pivotally mounted on said base for movement between clamped and release positions, a tension lever pivotally mounted on said base opposed from said second catch member pivotal mount and movable between closed and released positions, and means interconnecting said second catch member and said tension lever for defining a past dead center spring connection to retain said second catch member in the clamped position when said tension lever is in its closed position.

* * * * *